(12) United States Patent
Soleño et al.

(10) Patent No.: US 10,218,284 B1
(45) Date of Patent: Feb. 26, 2019

(54) DC-DC POWER CONVERTERS INCLUDING A VALLEY SKIPPING MODE AND METHODS OF OPERATING DC-DC POWER CONVERTERS

(71) Applicant: Astec International Limited, Kowloon (HK)

(72) Inventors: Antonio Remetio Soleño, Mandaluyong (PH); Kenneth Rivera Lazo, Dasmariñas (PH)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/988,984

(22) Filed: May 24, 2018

(51) Int. Cl.
*H02M 3/335* (2006.01)
*H02M 1/00* (2006.01)

(52) U.S. Cl.
CPC ..... *H02M 3/33592* (2013.01); *H02M 3/3353* (2013.01); *H02M 3/33507* (2013.01); *H02M 2001/0009* (2013.01)

(58) Field of Classification Search
CPC . H02M 2001/0003; H02M 2001/0009; H02M 3/335; H02M 3/33507; H02M 3/3353; H02M 3/33561; H02M 3/33569; H02M 3/33576; H02M 3/33592
See application file for complete search history.

(56) References Cited

U.S. PATENT DOCUMENTS

| 8,964,420 | B2* | 2/2015 | Zhang | H02M 3/33592 363/21.12 |
|---|---|---|---|---|
| 2002/0141209 | A1* | 10/2002 | Bridge | H02M 3/33592 363/89 |
| 2016/0094137 | A1* | 3/2016 | Jitaru | H02M 3/3353 363/21.03 |
| 2017/0033698 | A1* | 2/2017 | Vemuri | H02M 3/33592 |
| 2018/0083538 | A1* | 3/2018 | Kong | H02M 1/44 |
| 2018/0109196 | A1* | 4/2018 | Lin | H02M 3/33507 |
| 2018/0226895 | A1* | 8/2018 | Song | H02M 3/33569 |

* cited by examiner

*Primary Examiner* — Timothy J. Dole
*Assistant Examiner* — Shahzeb K Ahmad
(74) *Attorney, Agent, or Firm* — Harness, Dickey & Pierce, P.L.C.

(57) ABSTRACT

A DC-DC power converter includes an input, an output, a transformer, and a primary FET coupled to selectively conduct current though a primary winding of the transformer. The primary FET includes a drain that experiences multiple resonant voltage valleys during each dead-time period of the converter. The converter further includes a synchronous rectifier coupled to selectively conduct current through a secondary winding of the transformer, and a control circuit. The control circuit is configured to operate the primary FET in a valley skipping mode by turning on the primary FET during a second or subsequent one of the multiple resonant voltage valleys, and to allow a negative current in the secondary winding of the transformer before turning off the synchronous rectifier during one or more of the multiple resonant voltage valleys. Methods of operating DC-DC power converters are also disclosed.

26 Claims, 5 Drawing Sheets

DC-DC POWER CONVERTERS INCLUDING A VALLEY SKIPPING MODE AND METHODS OF OPERATING DC-DC POWER CONVERTERS

FIELD

The present disclosure relates to DC-DC power converters including a valley skipping mode and methods of operating DC-DC power converters.

BACKGROUND

This section provides background information related to the present disclosure which is not necessarily prior art.

Flyback converters are commonly used in low-power applications because they can operate at a wide input voltage range, can provide isolation, require less components, etc. Among flyback converters, variable frequency flyback converters, which are commonly known as quasi-resonant (QR) flyback converters, operate at lower frequencies during full load conditions and increase their operating frequency as the load decreases.

During switch turn-on in a flyback converter, power may be dissipated in the switch through turn-on loss and conduction loss. Quasi-resonant flyback converters can eliminate or partially eliminate turn-on losses by using a valley-switching mode of operation. In quasi-resonant operation, energy stored in a primary MOSFET drain capacitor (i.e., an equivalent capacitance), resonates through a magnetizing inductance of a transformer. A controller can detect a lowest valley of the resonating voltage and turn on the primary MOSFET during the lowest valley to reduce turn-on losses.

During quasi-resonant operation, turn-on loss of the primary MOSFET may be fully eliminated (during full zero-voltage switching (ZVS), or partially eliminated (during partial ZVS)). Full ZVS may or may not be achieved based on the input voltage and a reflected output voltage. For example, ZVS operation is not achieved when the reflected output voltage is lower than a DC input voltage.

SUMMARY

This section provides a general summary of the disclosure, and is not a comprehensive disclosure of its full scope or all of its features.

According to one aspect of the present disclosure, a DC-DC power converter includes an input for receiving a DC input voltage from a voltage source, an output for supplying a DC output voltage to a load, and a transformer coupled between the input and the output. The transformer has a primary winding and a secondary winding. The converter also includes a primary field-effect transistor (FET) coupled to selectively conduct current through the primary winding of the transformer. The primary FET includes a drain that experiences multiple resonant voltage valleys during each dead-time period of the converter. The converter further includes a synchronous rectifier coupled to selectively conduct current through the secondary winding of the transformer, and a control circuit. The control circuit is configured to operate the primary FET in a valley skipping mode by turning on the primary FET during a second or subsequent one of the multiple resonant voltage valleys during each dead-time period of the converter, and to allow a negative current in the secondary winding of the transformer before turning off the synchronous rectifier during one or more of the multiple resonant voltage valleys during each dead-time period of the converter.

According to another aspect of the present disclosure, a method of operating a DC-DC power converter is disclosed. The converter includes an input, an output, and a transformer coupled between the input and the output. The transformer has a primary winding and a secondary winding. The converter also includes a primary field-effect transistor (FET) coupled to selectively conduct current through the primary winding and a synchronous rectifier coupled to selectively conduct current through the secondary winding. The primary FET includes a drain that experiences multiple resonant voltage valleys during each dead-time period of the converter. The method includes operating the primary FET in a valley skipping mode by turning on the primary FET during a second or subsequent one of the multiple resonant voltage valleys during each dead-time period of the converter, and allowing a negative current in the secondary winding before turning off the synchronous rectifier during one or more of the multiple resonant voltage valleys during each dead-time period of the converter.

According to yet another aspect of the present disclosure, a control circuit for a DC-DC power converter generally includes a first output configured to supply a control signal to a primary field-effect transistor (FET) coupled to selectively conduct current through a primary winding of a transformer. The primary FET including a drain that experiences multiple resonant voltage valleys during each dead-time period of the converter. The control circuit also includes a second output configured to supply a control signal to a synchronous rectifier coupled to selectively conduct current through a secondary winding of the transformer. The control circuit is configured to operate the primary FET in a valley skipping mode by turning on the primary FET during a second or subsequent one of the multiple resonant voltage valleys during each dead-time period of the converter, and to allow a negative current in the secondary winding of the transformer before turning off the synchronous rectifier during one or more of the multiple resonant voltage valleys during each dead-time period of the converter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1:
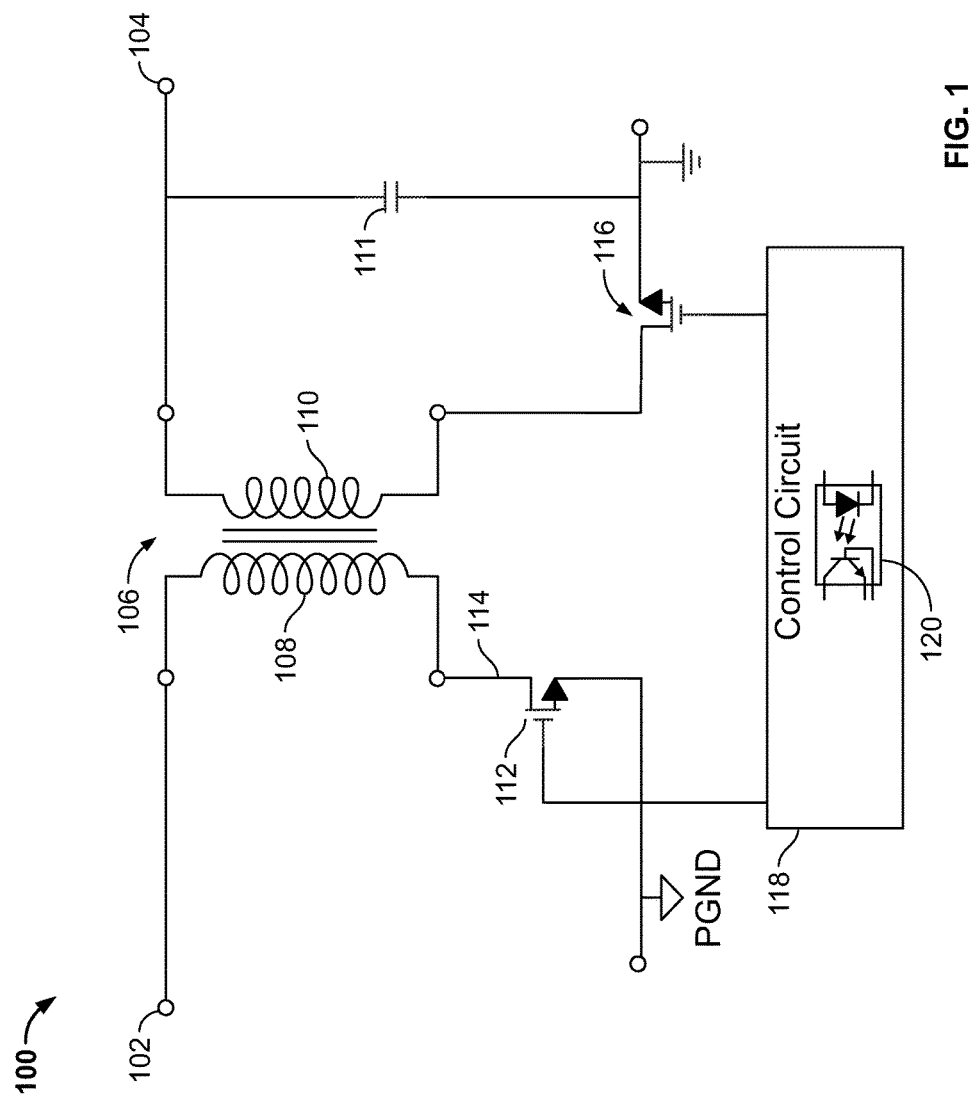
FIG. 1 is a block diagram of an isolated DC-DC flyback power converter, according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An isolated DC-DC flyback power converter according to one example embodiment of the present disclosure is illustrated in FIG. 1 and indicated generally by reference number 100. The converter 100 includes an input 102 for receiving a DC input voltage from a voltage source, an output 104 for supplying a DC output voltage to a load, and a transformer 106 coupled between the input 102 and the output 104. The transformer 106 has a primary winding 108 and a secondary winding 110.

The converter 100 also includes a primary field-effect transistor (FET) 112 coupled to selectively conduct current through the primary winding 108 of the transformer 106. The converter 100 further includes a synchronous rectifier 116 coupled to selectively conduct current through the secondary winding 110 of the transformer 106. The primary FET 112 includes a drain 114 that experiences multiple resonant voltage valleys during each dead-time period of the converter (e.g., a time period of one or more switching cycles where both the primary FET 112 and the synchronous rectifier 116 are turned off, thereby causing multiple resonant voltage oscillations to occur across the drain of the primary FET 112, etc.).

As shown in FIG. 1, the converter 100 includes a control circuit 118. The control circuit 118 is configured to operate the primary FET 112 in a valley skipping mode by turning on the primary FET 112 during a second or subsequent one of the multiple resonant voltage valleys during each dead-time period of the converter 100. The control circuit 118 is also configured to allow a negative current in the secondary winding 110 of the transformer 106 before turning off the synchronous rectifier 116 during one or more of the multiple resonant voltage valleys during each dead-time period of the converter 100. The converter 100 also includes an output capacitor 111.

As used herein, a dead-time period of the converter may refer to a time period of one or more switching cycles where the primary FET 112 is turned off. For example, the dead-time period of the converter may refer to a time period where both the primary FET 112 and the synchronous rectifier 116 are turned off (e.g., between two switching cycles, etc.), thereby causing multiple resonant voltage oscillations to occur across the drain of the primary FET 112.

Figure 2:
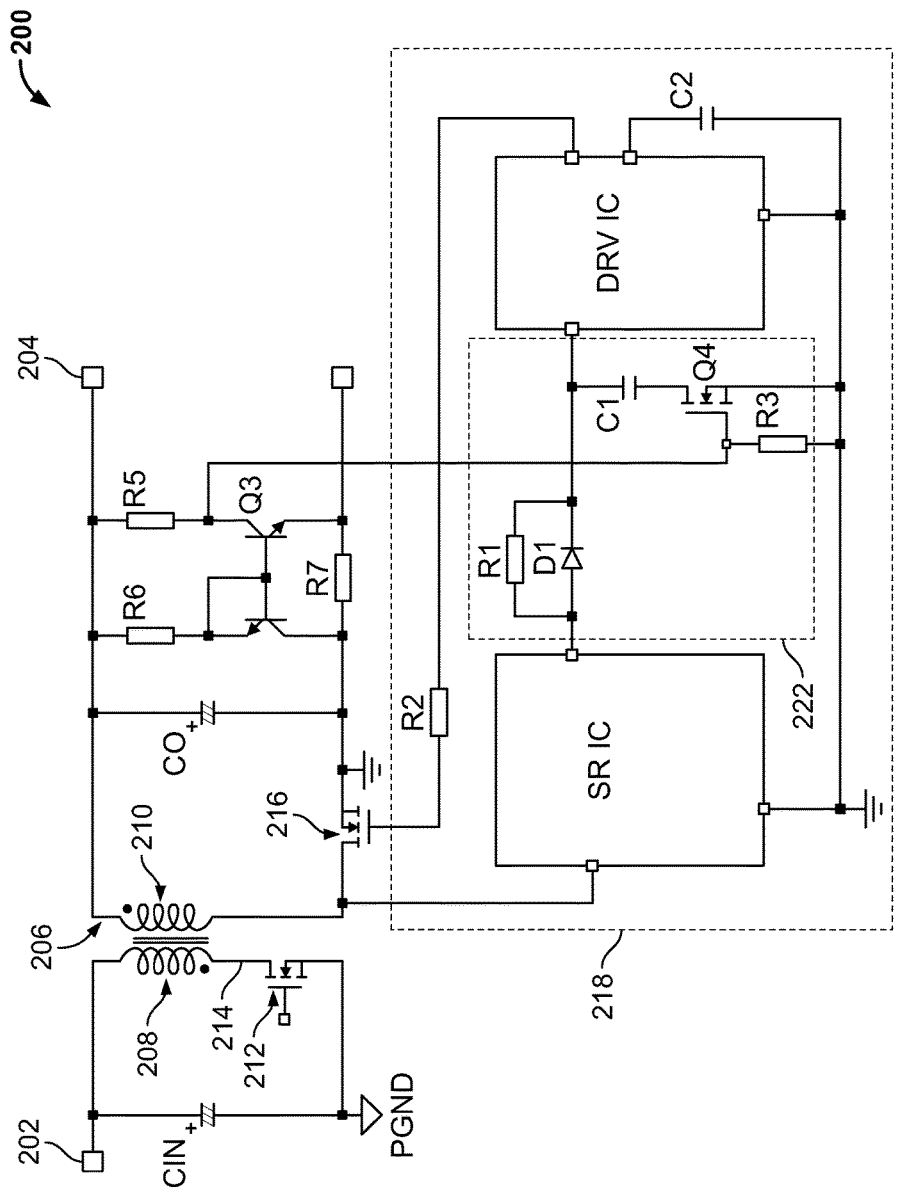
FIG. 2 is a circuit diagram of an isolated DC-DC flyback power converter including a delay circuit, according to another example embodiment of the present disclosure.

An isolated DC-DC flyback power converter according to another example embodiment of the present disclosure is illustrated in FIG. 2 and indicated generally by reference number 200. The converter 200 includes an input 202, an output 204, and a transformer 206 coupled between the input 202 and the output 204. The transformer 206 includes a primary winding 208 and a secondary winding 210. Although FIG. 2 illustrates the transformer 206 as including a single primary winding 208 and secondary winding 210, other embodiments may include multiple primary windings, multiple secondary windings, etc.

The converter 200 also includes a primary field-effect transistor (FET) 212, and a synchronous rectifier 216. The primary FET 212 includes a drain 214 that experiences multiple resonant voltage valleys during each dead-time period of the converter. The primary FET 212 is configured to operate in a valley skipping mode by turning on during a second or subsequent one of the multiple resonant voltage valleys during each dead-time period of the converter 200. For example, the primary FET 212 could be turned on during a second valley, a third valley, a fourth valley, etc.

As shown in FIG. 2, the converter 200 includes a control circuit 218. The control circuit 218 is configured to allow a negative current in the secondary winding 210 of the transformer 206 before turning off the synchronous rectifier 216 during one or more of the multiple resonant voltage valleys.

Although FIG. 2 illustrates only a portion of the control circuit 218 coupled to the secondary side of the converter 200 and the synchronous rectifier 216, the control circuit 218 may control the primary FET 212 in any suitable control implementation. For example, FIG. 1 illustrates a control circuit 118 connected with the primary FET 112 and the synchronous rectifier 116. In this case, the control circuit may include an optional isolator 120 to maintain isolation between primary and secondary sides of the converter 100. Alternatively, or in addition, the control circuits 118 and 218 may include separate controllers on the primary and secondary sides of the converter 200 that operate independently of one another, transmit control signals between one another via an isolator 120, etc.

Referring back to FIG. 2, the control circuit includes a delay circuit 222 having a resistor R1 coupled with a capacitor C1. In this case, the control circuit 218 is configured to allow the negative current by waiting a specified delay period after detecting a zero current in the secondary winding 210 of the transformer 206 before turning off the synchronous rectifier 216. The specified delay period for turning off the synchronous rectifier 216 can be determined based on values of the resistor R1 and the capacitor C1.

The delay circuit 222 includes a delay switch Q4 coupled with the capacitor C1 to selectively turn on and turn off the delay circuit 222. For example, the delay switch Q4 may introduce the specified delay period to the control circuit 218 when the switch Q4 is turned on, and may remove the specified delay period when the switch Q4 is turned off.

A selection switch Q3 is coupled between the output 204 and the delay switch Q4 to selectively turn on and turn off the delay switch Q4. In this manner, the selection switch Q3 can introduce the specified delay period during one or more of the multiple resonant voltage valleys, in response to a load condition at the output 204.

For example, the selection switch Q3 is coupled to the output 204 in a resistor network including resistors R5, R6 and R7, and is coupled to a gate of the delay switch Q4 at a node that is grounded through resistor R3. Values of the resistors R3, R5, R6 and R7 may specify a load condition at which the selection switch Q3 will turn on the delay circuit 222.

As shown in FIG. 2, the control circuit 218 includes an integrated circuit (SR IC) configured to detect a zero current in the secondary winding 210. In response to detecting the zero current, the integrated circuit (SR IC) outputs a control signal to turn off the synchronous rectifier 216.

For example, the integrated circuit (SR IC) may detect the zero current by sensing a voltage across a drain of the synchronous rectifier 216. In some cases, the integrated circuit may only detect positive current and may turn off at zero current. A diode D1 is coupled in parallel with the resistor R1 to inhibit a turn-on delay, but provide a turn-off delay to a driver integrated circuit (DRV IC) input.

The delay circuit 222 is coupled between the integrated circuit (SR IC) and the synchronous rectifier 216 to introduce the specified delay period in response to the integrated circuit (SR IC) outputting the control signal to turn off the synchronous rectifier 216. For example, the delay circuit 222 can delay the turn off signal from the integrated circuit (SR IC) to the synchronous rectifier 216 when the delay switch Q4 is turned on.

The control circuit 218 also includes a driver circuit (DRV IC) coupled to receive a signal from the delay circuit 222 and drive the synchronous rectifier 216. The driver circuit (DRV IC) is coupled to the synchronous rectifier 216 via a resistor R2, and has one pin coupled to ground through a capacitor C2.

Once an output of the integrated circuit (SR IC) goes low, the capacitor C1 is discharged through the resistor R1. The time period for the capacitor C1 to discharge below a turn-off threshold of an input of the driver circuit (DRV IC) corresponds to the specified delay period, and causes a delay in the driver circuit (DRV IC) turning off the synchronous rectifier 216.

The converter 200 optionally includes an input capacitor CIN coupled with the input 202, and an output capacitor CO coupled with the output 204. The input 202 and output 204 may include any suitable wires, terminals, electrical connectors, etc. for connecting with a voltage source, a load, etc.

In some embodiments, and as explained further below, the specified delay period may be sufficient to allow a negative current in the synchronous rectifier 216 before the synchronous rectifier 216 is turned off. For example, the negative current can energize a magnetizing inductance of the transformer 206 to discharge an equivalent capacitance of the primary FET 212 before the primary FET 212 is turned on. In some cases, the equivalent capacitance of the primary FET 212 is discharged to zero before the primary FET 212 is turned on to facilitate zero voltage switching (ZVS) of the primary FET 212.

Figure 3:
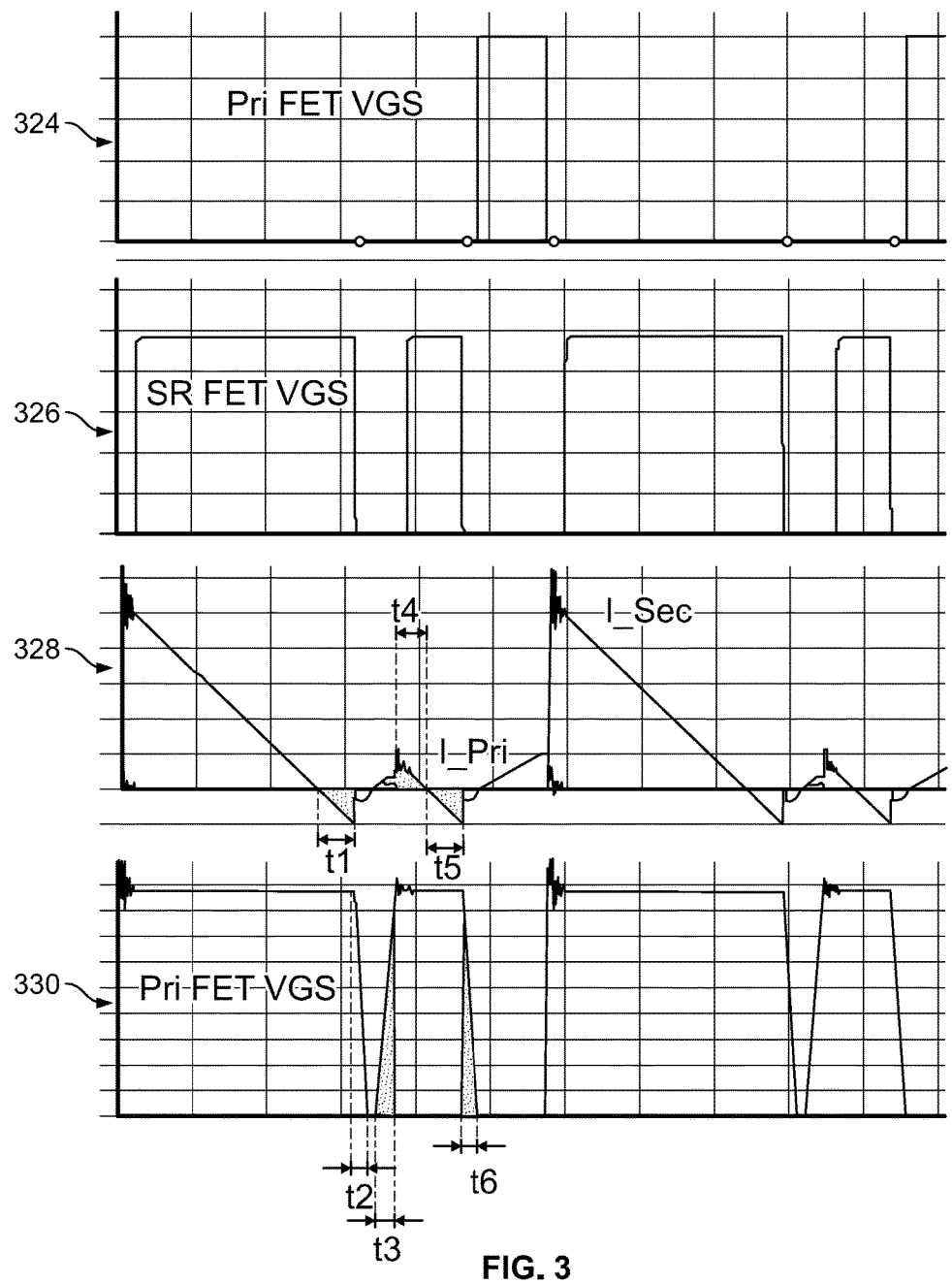
FIG. 3 is a line graph illustrating example voltage and current waveforms of the converter of FIG. 2.

FIG. 3 illustrates waveforms of an example operation of the primary FET 212 and the synchronous rectifier 216 of the converter 200 of FIG. 2. As shown in FIG. 3, prior to the time period t1, a control signal 324 from the control circuit 218 to the gate of the primary FET 212 is low, so the primary FET 212 is turned off. A control signal 326 from the control circuit 218 to the gate of the synchronous rectifier 216 is high, so the synchronous rectifier is turned on. During this period prior to the time period t1, a secondary current 328 in the secondary winding 210 ramps down.

During the time period t1, the secondary current 328 in the secondary winding 210 becomes negative due to the specified delay period in the control signal 326 for turning off the synchronous rectifier 216. As described above, the specified delay period starts after the integrated circuit (SR IC) detects a zero crossing of the secondary current 328, and allows the secondary current 328 to become negative.

At the end of the time period t1, the control signal 326 turns off the synchronous rectifier 216, and a drain-source voltage 330 of the primary FET 212 decreases during the time period t2. Specifically, the negative secondary current energizes a magnetizing inductance of the transformer 206 during the time period t1, which discharges an equivalent capacitance of the drain-source voltage 330 of the primary FET 212 during the time period t2.

During the time period t3, the secondary current 328 goes positive. The equivalent capacitance across the drain 214 of the primary FET 212 is charged by the input voltage through the magnetizing inductance of the transformer 206.

When the equivalent capacitance across the drain 214 of the primary FET 212 is discharged to zero (e.g., fully discharged) at the end of the time period t2, and when the input voltage is greater than the reflected output voltage (e.g., Vin>nVo), a positive secondary current 328 may occur during the time period t4. Specifically, as the voltage across the drain 214 of the primary FET 212 swings upward during the time period t3, positive secondary current 328 will conduct in the secondary winding 210 of the transformer 206 during the time period t4 due to resonance of the equivalent capacitance of the primary FET 212 and the magnetizing inductance of the transformer 206, exceeding the input voltage plus the reflected output voltage (e.g., Vin+nVo).

During the time period t4, the integrated circuit (SR IC) can detect the positive secondary current 328 and turn on the synchronous rectifier 216, which causes the secondary current 328 to decrease. During the time period t5, the specified delay period allows the secondary current 328 to go negative before the synchronous rectifier 216 is turned off.

The negative secondary current during the time period t5 energizes the magnetizing inductance of the transformer 206 to discharge the equivalent capacitance of the primary FET 212 from a voltage (Vin+nVo) down to zero, thereby allowing ZVS turn on of the primary FET 212 at the end of the time period t6.

During multiple valley operation that occurs at light loads, turning on the synchronous rectifier 216 at every valley may reduce the efficiency of the converter 200. In some cases, efficiency may be increased by having the selection switch Q3 disable the delay switch Q4 during very light loads, which disables the turn-off delay of the synchronous rectifier 216. As described above, the selection switch Q3 senses the load current, although other embodiments may sense a feedback-loop control error-voltage, etc. to selectively enable and disable the delay switch Q4.

In one example embodiment, efficiency of a 45 W, 15V, 230 VAC converter may be increased by 0.94% (e.g., from 86.11% to 87.05%) at a 25% load using the control methods described herein. Efficiency may be increased by 1.40% (e.g., from 88.38% to 89.78%) at a 50% load, may be increased by 1.09% (e.g., from 89.17% to 90.26%) at a 75% load, may be increased by 1.04% (e.g., from 89.13% to 90.17%) at a 100% load, etc. Specified delay periods may be applied to different valleys of the multiple valley operations, such as a sixth valley at a 25% load, a third valley at a 50% load, a second valley at a 75% load, and a first valley at a 100% load. In other embodiments, different efficiencies, valleys, etc. may be used.

Figure 4:
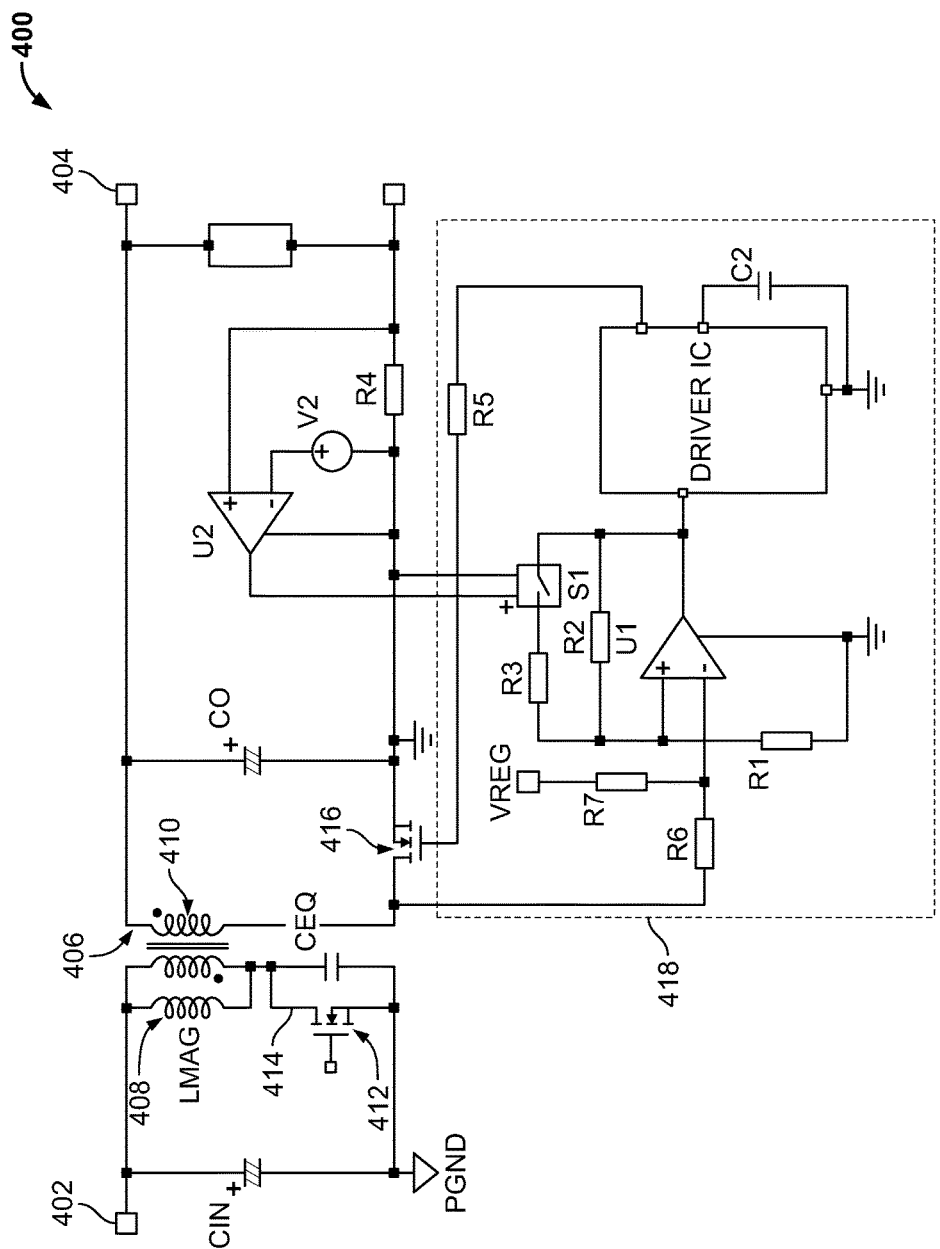
FIG. 4 is a circuit diagram of an isolated DC-DC flyback power converter including a comparator, according to yet another example embodiment of the present disclosure.

An isolated DC-DC flyback power converter according to another example embodiment of the present disclosure is illustrated in FIG. 4 and indicated generally by reference number 400. The converter 400 includes an input 402, an output 404, and a transformer 406 coupled between the input 402 and the output 404. The transformer 406 has a primary winding 408 and a secondary winding 410.

The converter 400 also includes a primary field-effect transistor (FET) 412, and a synchronous rectifier 416. The primary FET 412 includes a drain 414 that experiences multiple resonant voltage valleys during each dead-time period of the converter. The primary FET 412 is configured to operate in a valley skipping mode by turning on during a second or subsequent one of the multiple resonant voltage valleys during each dead-time period of the converter 400.

As shown in FIG. 4, the converter 400 also includes a control circuit 418. The control circuit 418 is configured to detect a positive current in the secondary winding 410 by sensing a voltage across the drain of the synchronous rectifier 416, turn on the synchronous rectifier 416 via the DRIVER IC, and selectively allow a negative current in the secondary winding 410 by using hysteresis to turn off the synchronous rectifier 416.

The control circuit 418 includes a comparator U1 having a first hysteresis threshold and a different second hysteresis threshold. In this case, a value of negative current through the synchronous rectifier 416 is determined based on a value of one of the two different hysteresis thresholds.

The converter 400 also includes a selection switch S1 coupled between the output 204 and the comparator U1 to select between the first and second hysteresis thresholds. For example, one hysteresis threshold (e.g., turn-off hysteresis threshold) may allow the negative current through the synchronous rectifier 416 when a selection switch S1 is turned on, and another hysteresis threshold may not allow the negative current through the synchronous rectifier 416 when the selection switch S1 is turned off. This allows the selection switch S1 to introduce the negative current through the synchronous rectifier 416 during one or more of the multiple resonant voltage valleys, in response to a load condition at the output 204.

For example, the selection switch S1 is controlled by a comparator U2, which receives an input from a voltage reference V2 and a resistor R4. The selection switch S1 is connected with the comparator U1 through the resistors R2 and R3. Further, the comparator is connected to a voltage regulation reference VREG through a node coupled to a resistor R7, a resistor R6 and a resistor R1. The values of the resistors R1-R7 and the voltage references V2 and VREG may specify a load condition at which the selection switch S1 will alternate between hysteresis thresholds of the comparator U1, thereby enabling or disabling the negative current through the synchronous rectifier 416.

Figure 5:
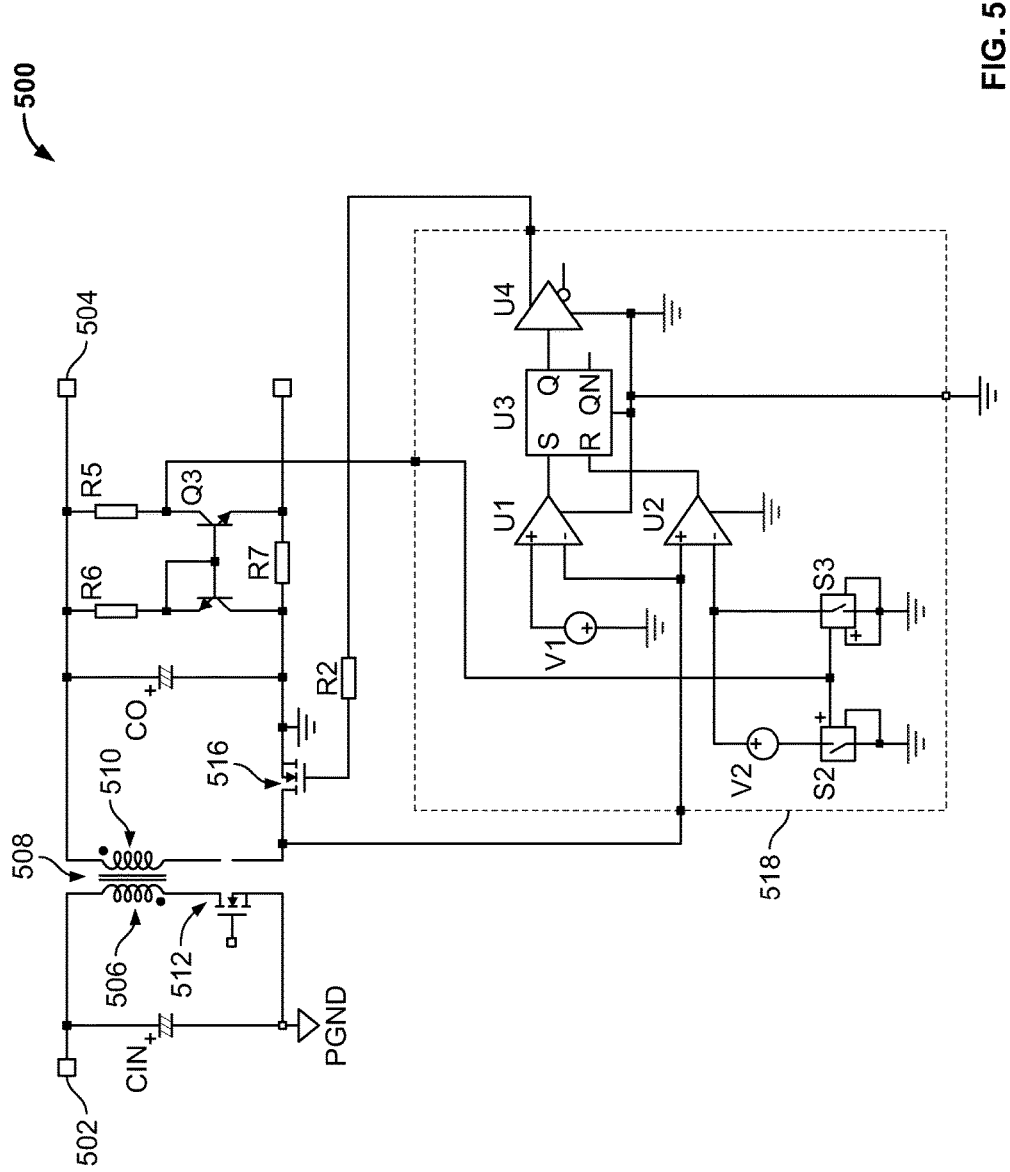
FIG. 5 is a circuit diagram of an isolated DC-DC flyback power converter including an integrated control circuit, according to a further example embodiment of the present disclosure.

An isolated DC-DC flyback power converter according to another example embodiment of the present disclosure is illustrated in FIG. 5 and indicated generally by reference number 500. The converter 500 includes an input 502, an output 504, and a transformer 506 coupled between the input 502 and the output 504.

The converter 500 also includes a primary field-effect transistor (FET) 512 coupled between the input 502 and the primary winding 508 of the transformer 506, and a synchronous rectifier 516 coupled between the output 504 and the secondary winding 510 of the transformer 506.

As shown in FIG. 5, the converter 500 also includes a control circuit 518. The control circuit 518 can be packaged as a single application-specific integrated circuit (ASIC). The control circuit 518 includes two comparators U1 and U2. V1 is a drain-sensing turn-on threshold, while V2 is a drain sensing turn-off threshold. In this case, V2 is used when the switch S2 is on and the switch S3 is off, and a zero voltage threshold is used when the switch S2 is off and the switch S3 is on.

The triggers for the switches S2 and S3 are opposite one another, and an input signal is received from outside the ASIC. If the trigger is high, the switch S2 is turned on and the switch S3 is turned off. If the trigger is low, the switch S2 is turned off and the switch S3 is turned on. When the V2 threshold is active, negative current is allowed in the synchronous rectifier 516. When the switch S2 is off and the switch S3 is on, drain-sensing will turn off the synchronous rectifier 516 at zero current.

As described herein, the example control circuits may include a microprocessor, microcontroller, integrated circuit, digital signal processor, etc., which may include memory. The control circuits may be configured to perform (e.g., operable to perform, etc.) any of the example processes described herein using any suitable hardware and/or software implementation. For example, the control circuits may execute computer-executable instructions stored in a memory, may include one or more logic gates, control circuitry, etc.

According to another example embodiment, a method of operating a DC-DC power converter is disclosed. The converter includes an input, an output, and a transformer coupled between the input and the output. The transformer has a primary winding and a secondary winding. The converter also includes a primary field-effect transistor (FET) coupled to selectively conduct current through the primary winding and a synchronous rectifier coupled to selectively conduct current through the secondary winding. The primary FET includes a drain that experiences multiple resonant voltage valleys during each dead-time period of the converter.

The method includes operating the primary FET in a valley skipping mode by turning on the primary FET during a second or subsequent one of the multiple resonant voltage valleys during each dead-time period of the converter, and allowing a negative current in the secondary winding before turning off the synchronous rectifier during one or more of the multiple resonant voltage valleys during each dead-time period of the converter.

In some embodiments, allowing the negative current in the secondary winding includes turning off the synchronous rectifier after a specified delay period in response to detecting a zero current in the secondary winding. The converter may include a delay circuit having a resistor coupled with a capacitor, and a delay switch coupled with the capacitor, and the specified delay period can be determined based on values of the resistor and the capacitor. In that case, the method may include controlling the delay switch to selectively turn on and turn off the delay circuit during the one or more of the multiple resonant voltage valleys. Selectively turning on and turning off the delay circuit may include selectively turning on and turning off the delay circuit to introduce the specified delay period during the one or more of the multiple resonant voltage valleys, in response to a load condition at the output.

In some embodiments, the converter includes a comparator having a first hysteresis threshold and a different second hysteresis threshold, and a value of allowed negative current through the synchronous rectifier is determined based on a value of a first one of the two different hysteresis thresholds. In that case, the method may include selecting between the first and second hysteresis thresholds to introduce the negative current through the synchronous rectifier during the one or more of the multiple resonant voltage valleys, in response to a load condition at the output.

Turning off the synchronous rectifier after a specified delay period may include allowing a negative current in the synchronous rectifier before turning off the synchronous rectifier. In some embodiments, turning on the primary FET includes allowing the negative current to energize a magnetizing inductance of the transformer to discharge an equivalent capacitance of the primary FET before the primary FET is turned on. In that case, turning on the primary FET may include allowing the equivalent capacitance of the primary FET to discharge to zero before the primary FET is turned on to facilitate zero voltage switching (ZVS) of the primary FET.

In another example embodiment, a control circuit for a DC-DC power converter generally includes a first output configured to supply a control signal to a primary field-effect transistor (FET) coupled to selectively conduct current through a primary winding of a transformer. The primary FET including a drain that experiences multiple resonant voltage valleys during each dead-time period of the converter. The control circuit also includes a second output configured to supply a control signal to a synchronous rectifier coupled to selectively conduct current through a secondary winding of the transformer. The control circuit is configured to operate the primary FET in a valley skipping mode by turning on the primary FET during a second or subsequent one of the multiple resonant voltage valleys during each dead-time period of the converter, and to allow a negative current in the secondary winding of the transformer before turning off the synchronous rectifier during one or more of the multiple resonant voltage valleys during each dead-time period of the converter.

Example embodiments described herein may be used in any suitable converter topology and mode of operation, including a quasi-resonant flyback converter operated in a frequency foldback mode. For example, the converter may include a variable frequency flyback converter (commonly known as quasi-resonant), that operates at a lower frequency during a full-load condition and increases operating frequency as the load decreases. Frequency foldback operation can be used to inhibit the converter from operating at a very high frequency during light loads. In some cases, the frequency foldback mode may be implemented using valley skipping operation for turn-on of the primary FET, where the primary FET is turned on during a second or subsequent one of multiple resonant voltage valleys experienced at a drain of the MOSFET during a dead-time period of the converter.

In some embodiments, the converter may include a critically-discontinuous mode flyback converter with synchronous rectification and a resistor-capacitor-diode (RCD) snubber, a critically-discontinuous mode flyback converter with synchronous rectification and an inductor-capacitor-diode (LCD) non-dissipative snubber, a critically-discontinuous mode buck-boost converter with synchronous rectification, etc.

Example embodiments described herein may provide one or more (or none) of the following advantages: increased efficiency of DC/DC converters, reduction of primary switch turn-on losses (e.g., when the converter is operating in a frequency-foldback, multiple valley-skipping mode), a smaller primary switch package due to reduced power dissipation, a smaller heatsink on a primary switch due to reduced power dissipation, reduced packaging density, reduced noise (e.g., dV/dt) during primary switch turn-on, improved electromagnetic interference (EMI), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An isolated DC-DC flyback power converter, comprising:
an input for receiving a DC input voltage from a voltage source;
an output for supplying a DC output voltage to a load;
a transformer coupled between the input and the output, the transformer having a primary winding and a secondary winding;
a primary field-effect transistor (FET) coupled to selectively conduct current through the primary winding of the transformer, the primary FET including a drain that experiences multiple resonant voltage valleys during each dead-time period of the converter;
a synchronous rectifier coupled to selectively conduct current through the secondary winding of the transformer; and a control circuit configured to operate the primary FET in a valley skipping mode by turning on the primary FET during a second or subsequent one of the multiple resonant voltage valleys during each dead-time period of the converter, and to allow a negative current in the secondary winding of the transformer before turning off the synchronous rectifier during one or more of the multiple resonant voltage valleys during each dead-time period of the converter.

2. The converter of claim 1, wherein:
the control circuit is configured to allow the negative current by waiting a specified delay period after detecting a zero current in the secondary winding of the transformer before turning off the synchronous rectifier.

3. The converter of claim 2, wherein:
the control circuit includes a delay circuit having a resistor coupled with a capacitor; and
the specified delay period is determined based on values of the resistor and the capacitor.

4. The converter of claim 3, wherein the delay circuit includes a delay switch coupled to selectively turn on and turn off the delay circuit.

5. The converter of claim 4, further comprising a selection switch coupled to selectively turn on and turn off the delay switch to introduce the specified delay period at the one or more of the multiple resonant voltage valleys.

6. The converter of claim 5, wherein the specified delay period is sufficient to allow the negative current in the secondary winding of the transformer before the synchronous rectifier is turned off.

7. The converter of claim 6, wherein the negative current is sufficient to energize a magnetizing inductance of the transformer to discharge an equivalent capacitance of the primary FET before the primary FET is turned on.

8. The converter of claim 7, wherein the control circuit is configured to allow the equivalent capacitance of the primary FET to discharge to zero before turning on the primary FET to facilitate zero voltage switching (ZVS) of the primary FET.

9. The converter of claim 2, wherein the delay circuit includes a diode in parallel with the resistor.

10. The converter of claim 9, wherein the delay circuit is coupled to introduce the specified delay period in response to the integrated circuit outputting the control signal to turn off the synchronous rectifier.

11. The converter of claim 1, wherein:
the control circuit includes a delay circuit having a comparator including a first hysteresis threshold and a different second hysteresis threshold; and
a value of the negative current allowed in the secondary winding of the transformer is determined based on a value of a first one of the two different hysteresis thresholds.

12. The converter of claim 11, further comprising a selection switch coupled between the output and the comparator to select between the first and second hysteresis thresholds to introduce the negative current through the secondary winding of the transformer during the one or more of the multiple resonant voltage valleys, in response to a load condition at the output.

13. The converter of claim 12, wherein the comparator is coupled to detect the zero current in the secondary winding output a control signal to turn off the synchronous rectifier after the negative current has started conducting through the secondary winding, when the first hysteresis threshold is selected by the selection switch.

14. The converter of claim 1, wherein the control circuit is configured to operate the converter in a quasi-resonant mode including frequency foldback.

15. The converter of claim 1, wherein the converter includes only one primary FET and only one synchronous rectifier.

16. A method of operating an isolated DC-DC flyback power converter, the converter including an input, an output, a transformer coupled between the input and the output, the transformer having a primary winding and a secondary winding, a primary field-effect transistor (FET) coupled between the input and the primary winding, the primary FET including a drain that experiences multiple resonant voltage valleys during each dead-time period of the converter, and a synchronous rectifier coupled between the output and the secondary winding, the method comprising:
operating the primary FET in a valley skipping mode by turning on the primary FET during a second or subsequent one of the multiple resonant voltage valleys during each dead-time period of the converter; and
allowing a negative current in the secondary winding before turning off the synchronous rectifier during one or more of the multiple resonant voltage valleys during each dead-time period of the converter.

17. The method of claim 16, wherein:
allowing the negative current in the secondary winding includes turning off the synchronous rectifier after a specified delay period in response to detecting a zero current in the secondary winding.

18. The method of claim 17, wherein:
the converter includes a delay circuit having a resistor coupled with a capacitor, and a delay switch coupled with the capacitor; and
the specified delay period is determined based on values of the resistor and the capacitor.

19. The method of claim 18, further comprising controlling the delay switch to selectively turn on and turn off the delay circuit during the one or more of the multiple resonant voltage valleys.

20. The method of claim 19, wherein selectively turning on and turning off the delay circuit includes selectively turning on and turning off the delay circuit includes to introduce the specified delay period during the one or more of the multiple resonant voltage valleys.

21. The method of claim 16, wherein:
the converter includes a comparator having a first hysteresis threshold and a different second hysteresis threshold; and
a value of the negative current allowed in the secondary winding of the transformer is determined based on a value of a first one of the two different hysteresis thresholds.

22. The method of claim 21, further comprising selecting between the first and second hysteresis thresholds to introduce the negative current through the secondary winding of the transformer during the one or more of the multiple resonant voltage valleys, in response to a load condition at the output.

23. The method of claim 16, wherein the specified delay period is sufficient to allow the negative current in the secondary winding of the transformer before turning off the synchronous rectifier.

24. The method of claim 23, wherein turning on the primary FET includes allowing the negative current to energize a magnetizing inductance of the transformer to discharge an equivalent capacitance of the primary FET before the primary FET is turned on.

25. The method of claim 24, wherein turning on the primary FET includes allowing the equivalent capacitance of the primary FET to discharge to zero before turning on the primary FET to facilitate zero voltage switching (ZVS) of the primary FET.

26. A control circuit for an isolated DC-DC flyback power converter, the control circuit comprising:
- a first output configured to supply a control signal to a primary field-effect transistor (FET) coupled to selectively conduct current through a primary winding of a transformer, the primary FET including a drain that experiences multiple resonant voltage valleys during each dead-time period of the converter; and
- a second output configured to supply a control signal to a synchronous rectifier coupled to selectively conduct current through a secondary winding of the transformer, the control circuit configured to operate the primary FET in a valley skipping mode by turning on the primary FET during a second or subsequent one of the multiple resonant voltage valleys during each dead-time period of the converter, and to allow a negative current in the secondary winding of the transformer before turning off the synchronous rectifier during one or more of the multiple resonant voltage valleys during each dead-time period of the converter.

* * * * *